United States Patent [19]

Kugioka

[11] Patent Number: 4,639,084
[45] Date of Patent: Jan. 27, 1987

[54] LENS BARREL IN WHICH MOTOR CAPABLE OF SELECTING STEPPING DRIVE OR BRUSHLESS DRIVE IS PROVIDED

[75] Inventor: Michihiro Kugioka, Kawasaki, Japan

[73] Assignee: Canon Kabushiki Kaisha, Tokyo, Japan

[21] Appl. No.: 686,150

[22] Filed: Dec. 26, 1984

[30] Foreign Application Priority Data

Jan. 10, 1984 [JP] Japan .................................. 59-2428
Jan. 19, 1984 [JP] Japan .................................. 59-8340

[51] Int. Cl.⁴ ........................ G02B 7/04; H02K 21/08
[52] U.S. Cl. ................................. 350/255; 310/49 R; 310/112
[58] Field of Search ..................... 350/255; 354/400; 310/112, 114, 156, 49 R

[56] References Cited

U.S. PATENT DOCUMENTS 2,750,522  6/1956  Seiden ................................. 310/112
3,549,918  12/1970 Hendrik et al. ..................... 310/112
3,809,990  5/1974  Kuo et al. ........................... 310/49 R
3,917,394  11/1975 Sturdevant ........................... 350/255

FOREIGN PATENT DOCUMENTS 28424    2/1982  Japan .
186738   11/1982 Japan .
122506   7/1983  Japan ................................ 350/255
214130   12/1983 Japan ................................ 354/400

Primary Examiner—William H. Punter
Attorney, Agent, or Firm—Fitzpatrick, Cella, Harper & Scinto

[57] ABSTRACT

A lens barrel provided therein with a hollow cylindrical permanent magnet having a permanent magnet portion for stepping drive and a magnet portion for brushless drive, a step driving coil and a brushless driving coil, and a focusing lens system axially moved by the rotary motion of the cylindrical permanent magnet. In case the amount of movement of the lens system required for bringing it to the focused position exceeds a determined value, the lens system is moved to a position corresponding to the determined value by the rotary motion of the brushless driving permanent magnet portion, and in case the above-mentioned amount is equal to or less than the determined value, the lens system is brought to the focused position by the rotary motion of the step driving permanent magnet portion.

3 Claims, 8 Drawing Figures

LENS BARREL IN WHICH MOTOR CAPABLE OF SELECTING STEPPING DRIVE OR BRUSHLESS DRIVE IS PROVIDED

BACKGROUND OF THE INVENTION

1. Field of the Invention

The present invention relates to a lens barrel incorporating a motor, and more particularly to a lens barrel incorporating a motor provided with a rotor composed of a cylindrical permanent magnet and capable of selecting either a stepping drive in which said cylindrical permanent magnet is step-driven as a stepping motor or a brushless drive in which said magnet is continuously driven as a brushless motor.

2. Description of the Prior Art

In the photo-taking system composed of a camera and lens, a recently promoted automatic feature of the camera is the so-called automatic focusing device, which automatically brings of focusing lens in the lens tube to the in-focus position without manipulation by the user.

The above-mentioned automatic focusing device utilizes the rotary force of a motor for moving the focusing lens to the in-focus position, and an improved hollow sturcture of said motor is disclosed, for example, in the Japanese Patent Laid-open No. 186738/1982 and in the Japanese Utility Model Laid-open No. 28424/1982, in which the rotor is made hollow and the hollow portion is utilized for accommodating the photo-taking or other optical system.

Such a hollow motor can be constructed as a linear motor, a stepping motor, a coreless motor or a brushless motor. The stepping motor has an accurate rotating angle in respons to an input signal and therefore achieves improved focusing accuracy when employed in the control of the focusing lens. However, being designed for stepwise rotation in response to pulse signals, it requires a longer time for moving the focusing lens from an initial position to a final in-focus position. The motor will not be properly driven if a higher driving frequency is employed. Also, the stepping motor has a lower starting torque in comparison with other motors, such as a brushless motor, for driving the focusing lens. To obtain enough starting torque, a larger motor is required, which is inconvenient for incorporating inthe lens tube and which adversely affects the portability of the lens tube, given the motor size and the power source required therefor.

On the other hand, in the case of moving the focusing lens by means of a brushless motor through means for converting the rotary motion into a linear motion, it becomes necessary to precisely control the stopping of the rotor for correctly stopping the focusing lens at the in-focus position, and, for this purpose there is required a complicated control system for controlling the inertia and braking of the rotor.

SUMMARY OF THE INVENTION

In consideration of the foregoing, an object of the present invention is to provide a motor adapted for being incorporated in a lens barrel and for controlling the movement of the focusing lens.

For the above mentioned object, the present invention also provides a lens barrel incorporating a motor, which avoids the aforementioned disadvantages of the stepping motor and brushless motor and fully utilizes the advantages thereof.

The above-mentioned object can be achieved according to the present invention by a structure comprising a hollow cylindrical permanent magnet which is rotatably supported around the optical axis of an optical lens system in a lens barrel and is provided, at an end of said magnet, with plural N and S poles along the entire periphery of said magnet to form a step driving permanent magnet portion constituting a rotor of a brushless stepping motor and, at the other end, with two or four N and S poles to form a brushless drive permanent magnet portion constituting a rotor of a brushless motor two-ring-shaped coils and a ring-shaped yoke member with tooth-shaped poles to be magnetized by said coil, both positioned outside said step driving permanent magnet portion and supported by a fixed part of said lens barrel; and brushless driving coils and a yoke member both positioned outside said brushless driving permanent magnet portion and supported by a fixed part of said lens tube; wherein the electric current is supplied either to said step driving coils or to said brushless driving coils to cause the rotor, composed of said hollow cylindrical permanent magnet, to perform stepwise rotation of a stepping motor or continuous rotation of a brushless motor and said rotation is converted into a linear motion to displace the focusing lens to the in-focus position.

A second object of the present invention is to provide a lens barrel capable of minimizing the time period required for automatic focusing by the use of a hybrid motor combining a stepping motor and a brushless motor as explained above. More, specifically, in said lens tube, the distance from the focusing lens to an object is measured, and, if said distance exceeds a predetermined value. the focusing lens is rapidly moved to a position close to the in-focus position by the above-explained brushless drive, and is then moved from said position to the in-focus position by said stepping drive, thereby reducing the entire time required for lens displacement.

A third object of the present invention is to provide a lens barrel provided with an encoding function capable of detecting the current position of the focusing lens at the movement thereof in the lens barrel by means of said hybrid motor. More specifically, in moving said focusing lens with said hybrid motor, if the distance to the object measured by the distance measuring means exceeds a determined value and the rotor is driven at high speed by the aforementioned brushless drive, signals inversely generated in the step driving coils by the rotation of the step driving permanent magnet portion of the rotor are detected and counted to control the amount of displacement of the focusing lens.

DETAILED DESCRIPTION OF THE PREFERRED EMBODIMENTS

Figure 1:
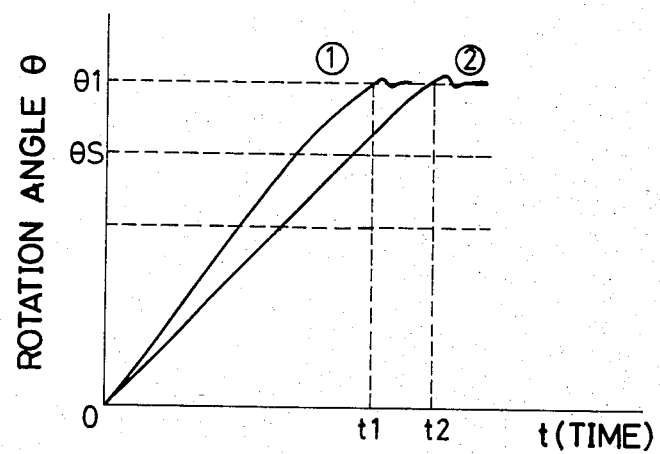
FIG. 1 is a characteristic chart showing the lens drive according to the present invention.

Reference is made to FIG. 1 for explaining the driving method of the motor of the present invention. The distance to the object is measured with distance measuring means, and an obtained distance signal is converted into a rotational angle $\theta_1$ of a rotor which drives a focusing lens to the in-focus position. If the rotor is driven stepwise, the driving time of the focusing lens, i.e. the moving time t2 of the focusing lens from an initial position to said in-focus position becomes very long, as shown by Curve (2) in FIG. 1. On the other hand, it is possible to achieve a shorter moving time t1, in comparison with the above-mentioned moving time t2, if the focusing lens is moved via the brushless drive from said initial position to a position $\theta s$ in front of the in-focus position and then moved in the step drive from said position $\theta s$ to the in-focus position. In FIG. 1, the ordinate indicates the rotational angle of the motor while the abscissa represents time. Curve (1) shows an example of conducting the brushless drive to said position $\theta s$ in front of the in-focus position of the focusing lens and the step drive from said position $\theta s$ to the infocus position $\theta 1$.

Figure 2A:
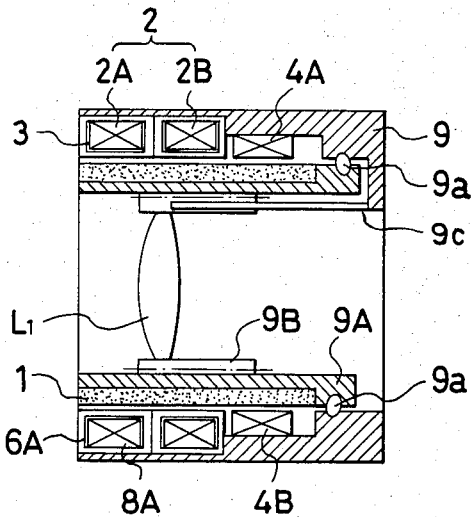
FIGS. 2A, 2B, 2C, 2D and 2E are a cross-sectional view of a lens drive device embodying the present invention and views of the stator and the rotor thereof.
Figure 2B:
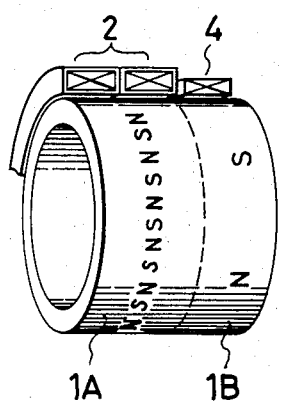
Figure 2C:
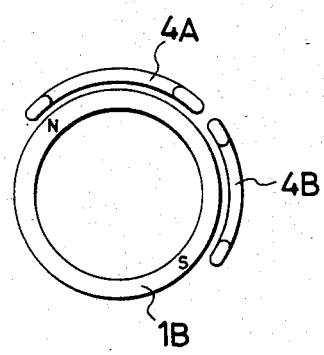
Figure 2D:
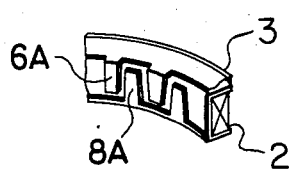
Figure 2E:
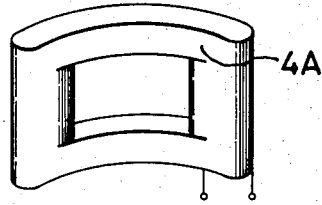

FIGS. 2A, 2B and 2C show the rotor and the stator of the hybrid motor of the present invention in which a brushless motor and a stepping motor are combined. A hollow cylindrical permanent magnet 1 is fixed on the outer periphery of a rotary tube 9A rotatably supported by bearings 9a, 9a in a fixed tube 9 of a lens barrel. A lens holder 9B, supporting a lens L1, has a helicoid connection with the rotary tube 9A. A key member 9C is provided for linearly guiding the lens holder. As shown in FIG. 2B, at an end 1A of the rotor along the optical axis of the lens there are provided plural N and S poles to constitute a stepping motor, while at the other end 1B there are formed two or four N and S poles. Said side 1A of the permanent magnet constitutes a rotor as a step driving permanent magnet portion, while said side 1B constitutes a rotor as a brushless driving permanent magnet portion. There are also provided stepping motor coils 2 and brushless motor coils 4. Said coils 2 are positioned outside the step driving permanent magnet portion 1A of the magnet 1, and are fixed inside said fixed tube through a coil bobbin to be explained later, while the coils 4 are positioned outside said brushless driving permanent magnet portion 1B and fixed on said fixed tube. Said coils 2 are formed on coil bobbins having mutually engaging tooth-shaped poles 6A, 8A as shown in FIG. 2D. In order to generate magnetic fields in the tooth-shaped poles, the coils 2 are formed as rings in said coil bobbin 3. On the other hand, the brushless driving coils 4 are formed in arc shapes as shown in FIG. 2E.

Figure 3:
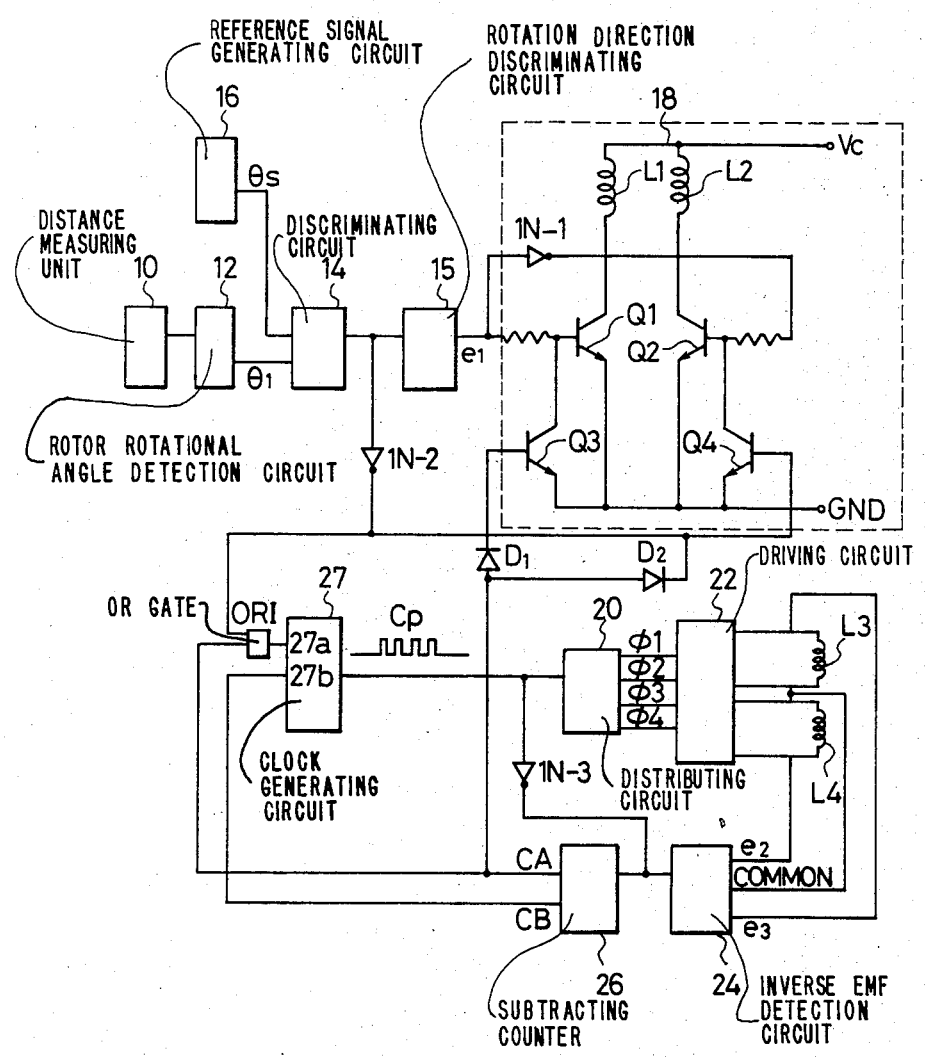
FIG. 3 is a block diagram of a control circuit for said lens drive device.
Figure 4:
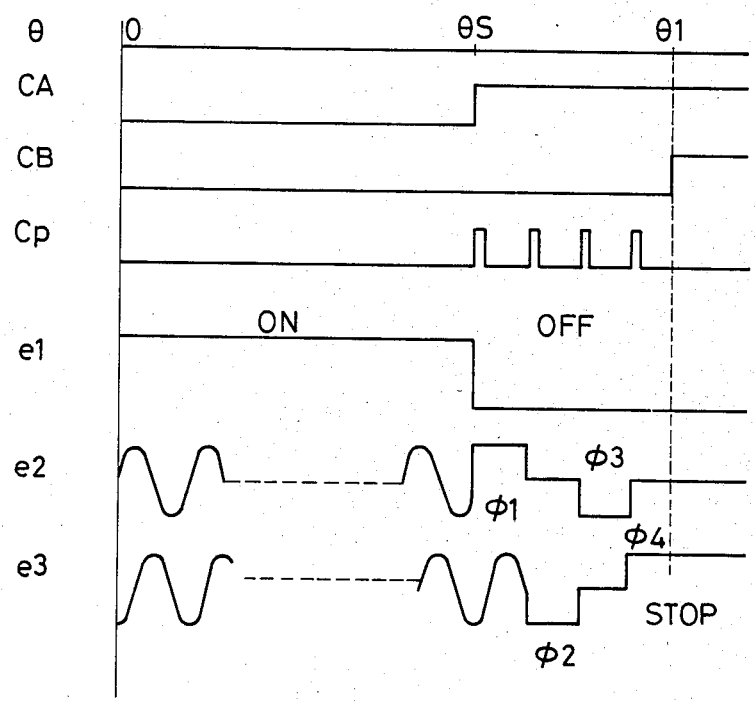
FIG. 4 is a timing chart showing various signals in the control circuit shown in FIG. 3.

FIG. 3 is a circuit diagram showing a control circuit for the brushless and step drives, and FIG. 4 is a timing chart showing various signals of said control circuit.

A circuit 12 detects the rotational angle of said rotor required for moving the focusing lens to the in focus position in response to a signal from a distance measuring unit 10, and releases an output signal $\theta 1$. A discriminating circuit 14 receives a reference signal $\theta s$ from a reference signal generating circuit 16. Said reference signal $\theta s$ indicates the signal level to be supplied to said brushless driving coils. Said discriminating circuit 14 compares the output signal $\theta 1$ of said detecting circuit 12 with the reference signal $\theta s$ to obtain a difference signal $\theta A$ and releases a logic signal H or L respectively indicating $\theta A > 0$ or $\theta A \leq 0$. A circuit 15 for discriminating the rotating direction of the rotor generates a logic signal H or L respectively in case of clockwise or counterclockwise rotation. There are further shown a brushless motor driving circuit 18, a distributing circuit 20 for stepping motor, a stepping motor driving circuit 22, a circuit 24 for detecting the inverse electromotive force in coils L3, L4 of the stepping motor, a subtracting counter 26 which starts a counting operation in synchronization with the function of the brushless motor and generates a carry signal CA at a determined count for terminating the function of the brushless motor, and a clock generating circuit 27. There are further provided inverters IN-1, IN-2, IN-3, diodes D1, D2 and an OR gate OR1.

In the following there will be explained the function of the above-described circuit.

At first the distance to the object is measured by the distance measuring unit, and, in response to the thus obtained distance signal, said detecting circuit 12 determines the rotational angle $\theta 1$ of the rotor for moving the focusing lens to the in-focus position. The signal from said detecting circuit 12 is supplied to the discriminating circuit 14 which calculates $\theta 1 - \theta s = \theta A$, discriminates whether $\theta A > \theta A$ or $\theta \leq 0$ and releases a logic signal "H" or "L" indicating the result of said discrimination.

If the object is positioned far and gl is sufficiently larger than $\theta s$ ($\theta A > 0$), said discriminating circuit 14 releases a signal "H". Then the rotating direction discriminating circuit 15 selects the coils to be energized, and supplies a signal e1 either to a transistor Q1 of the brushless motor driving circuit 18 or another transistor Q2 through the inverter IN-1, thereby turning on the transistor Q1 or Q2 to energize a coil L1 or L2 of the brushless motor. Consequently said hollow cylindrical permanent magnet rotates about the optical axis to displace the focusing lens along the optical axis by means of a helicoid mechanism of the lens holder (cf. FIG. 2A).

The rotation of said permanent magnet generates signals e2, e3 representing the inverse electromotive force respectively in the coils L3, L4 of the stepping motor. Said signals are determined by the stepping angle of the permanent magnet of the stepping motor, and assume forms corresponding to said stepping angles during a rotation of 180° or 90° of the permanent magnet in the brushless drive. The wave forms are counted by the counter 26. The counter 26 stores signals corresponding to the aforementioned signals $\theta s$ and $\theta 1$, compares the output signals corresponding to said inverse electromotive force in succession with the reference signal $\theta s$ and releases a carry signal CA when the counts mutually coincide Said carry signal CA is supplied either through the diode D1 or D2 to the base of a transistor Q3 or Q4 of the brushless motor driving circuit, thereby deactivating the brushless motor driving circuit. Thus the release of said carry signal CA indicates that the focusing lens has exceeded the brushless driving range.

Said carry signal CA is also supplied, through the OR gate OR1, to a set terminal 27a of the clock generating circuit 27 to activate the same for enerating clock pulses CP. The clock pulses CP are supplied to the pulse distributing circuit 20 for generating timing pulses $\phi 1-\phi 4$ for energizing the step driving coils. Said timing pulses $\phi 1-\phi 4$ are supplied to the stepping motor driving circuit 22 for energizing the stepping drive coils L3, L4, thus stepwise driving the rotor.

Said clock pulses CP are further supplied through the inverter IN-3 to, and for counting by said counter 26 until the rotational angle coincides with the in-focus position $\theta 1$, and a second carry signal CB is generated when a relation $\theta = \theta 1$ is reached. The carry signal CB is supplied to a reset terminal 27b of said clock pulse generator 27 to reset the same, thus terminating the generation of the clock pulses CP and deactivating the stepping motor driving circuit.

In the case of $\theta A < 0$, as the result of comparison of the output signal $\theta 1$ of said detecting circuit 12 with the reference signal $\theta s$, the discriminating circuit 14 releases an L-level output signal. Said L-level signal is inverted by the inverter IN-2 and supplied through the OR gate OR1 to the clock generating circuit 27 to generate the clock pulses CP, whereby the permanent magnet is driven stepwise thereafter.

The above-explained function will be explained again in relation to FIG. 4, wherein $\theta$ indicates the rotational angle and the in-focus position is reached when $\theta = \theta 1$. As shown in FIG. 4, while $\theta < \theta s$, the brushless driving coils are activated by the signal e1, and the step driving coils generate inverse voltages e2, e3. When $\theta = \theta s$ is reached, the carry signal CA is generated to terminate the power supply to the brushless driving coils and simultaneously generate the clock pulses CP, whereby the step driving coils are activated according to the pulses $\phi 1 - \phi 4$ to effect the stepping drive. When $\theta = \theta 1$ is reached, the second carry signal CB is generated to terminate the generation of the clock pulses CP, thereby interrupting the stepping drive.

As explained in the foregoing, the present invention enables efficient movement of the focusing lens to the in-focus position, by the presence of a brushless motor portion and a stepping motor portion in the same lens driving device. When the required angle of rotation is large, the lens drive is initially conducted by the brushless motor, but at the end phase is conducted by the stepping motor, thus bringing the lens to the required position without oscillation. In this manner it is possible to accelerate the lens by the brushless motor without the danger of desynchronization, and to properly position the lens by the stepping motor, thus achieving efficient and precise control.

In the foregoing description there has been employed an imaging lens L, but the present invention is similarly applicable to a focusing lens or a zooming lens.

What I claim is:

1. A lens barrel incorporating a motor, comprising:
   a hollow cylindrical permanent magnet positioned in said lens barrel and provided with a step driving permanent magnet portion and a brushless driving permanent magnet portion;
   step driving coils; and
   brushless driving coils;
   wherein a lens system is axially moved by the rotary motion of said hollow cylindrical permanent magnet; and
   wherein, in case the amount of movement required for bringing said lens system to the in-focus position exceeds a predetermined value, said lens system is moved to a position corresponding to said predetermined value by the rotary motion of said brushless driving permanent magnet portion, and, in case said amount is equal to or less than said predetermined value, said lens system is moved to said in-focus position by the stepping rotary motion of said step driving permanent magnet portion.

2. A lens tube incorporating a motor capable of selecting stepping drive or brushless drive, comprising:
   a hollow cylindrical permanent magnet rotatably supported in said lens tube about the optical axis of a lens optical system, wherein a first end of said permanent magnet along said optical axis is provided with plural N and S magnetic poles along the entire periphery thereof to constitute a step driving permanent magnet portion, while a second end of said permanent magnet is provided with two or four N and S magnetic poles to constitute a brushless driving permanent magnet portion;
   two sets of ring-formed coils and annular yoke member having tooth-shaped poles to be magnetized by said coils, both positioned outside siad step driving permanent magnet portion and fixed to a stationary part of said lens barrel; and
   brushless driving coils positined outside said brushless driving permanent magnet portion and fixed relative to a stationary part of said lens tube.

3. A lens barrel incorporating a motor according to claim 2, further comprising counter means for counting signals corresponding to the inverse electromotive force generated in said ring-formed coils by the rotation of said permanent magnet in the brushless drive of said lens optical system, wherein the end point control of the brushless drive of said motor is achieved by the output signal of said counter means.

* * * * *

UNITED STATES PATENT AND TRADEMARK OFFICE
CERTIFICATE OF CORRECTION

PATENT NO. : 4,639,084  
DATED : January 27, 1987  
INVENTOR(S) : MICHIHIRO KUGIOKA Page 1 of 2

It is certified that error appears in the above-identified patent and that said Letters Patent is hereby corrected as shown below:

COLUMN 1

Line 20, "of" should read --a--.
Line 46, "inthe" should read --in the--.

COLUMN 2

Line 11, "motor" should read --motor;--.
Line 31, "motor as explained above. More, specifically," should read --motor, as explained above. More specifically,--.

COLUMN 3

Line 19, "infocus" should read --in-focus--.
Line 55, "infocus" should read --in-focus--.

COLUMN 4

Line 21, "$\theta_A > \theta_A$ or $\theta \leq 0$" should read --$\theta_A > 0$ or $\theta_A < 0$--.
Line 24, "gl" should read --$\theta_1$--.
Line 59, "enerating" should read --generating--.
Line 67, "by said" should read --by, said--.

UNITED STATES PATENT AND TRADEMARK OFFICE
CERTIFICATE OF CORRECTION

PATENT NO. : 4,639,084
DATED : January 27, 1987
INVENTOR(S) : MICHIHIRO KUGIOKA

It is certified that error appears in the above-identified patent and that said Letters Patent is hereby corrected as shown below:

COLUMN 6

Line 34, "siad step" should read --said step--.
Line 37, "positined" should read --positioned--.

Signed and Sealed this

Sixth Day of October, 1987

Attest:

DONALD J. QUIGG

Attesting Officer

Commissioner of Patents and Trademarks